US012559256B2

(12) United States Patent
Dautelle et al.

(10) Patent No.: US 12,559,256 B2
(45) Date of Patent: Feb. 24, 2026

(54) METHOD FOR DETERMINING A PROBABILITY OF OCCURRENCE OF A MALFUNCTION CREATING A PERFORMANCE DEFECT IN AN AIRCRAFT

(71) Applicants: Airbus SAS, Blagnac (FR); Airbus Operations GmbH, Hamburg (DE)

(72) Inventors: Jean-Marie Dautelle, Blagnac (FR); Sara Wallinger, Hamburg (DE)

(73) Assignees: Airbus SAS, Blagnac (FR); Airbus Operations GmbH, Hamburg (DE)

( * ) Notice: Subject to any disclaimer, the term of this patent is extended or adjusted under 35 U.S.C. 154(b) by 277 days.

(21) Appl. No.: 18/519,418

(22) Filed: Nov. 27, 2023

(65) Prior Publication Data

US 2024/0174379 A1 May 30, 2024

(30) Foreign Application Priority Data

Nov. 29, 2022 (FR) ...................................... 2212516

(51) Int. Cl.
| | |
|---|---|
| *G06F 17/00* | (2019.01) |
| *B64F 5/40* | (2017.01) |
| *B64F 5/60* | (2017.01) |

(52) U.S. Cl.
CPC . *B64F 5/40* (2017.01); *B64F 5/60* (2017.01)

(58) Field of Classification Search
CPC ... B64F 5/40; B64F 5/60; G06F 17/18; G07C 5/085; G07C 5/0808
USPC .......................................................... 701/3
See application file for complete search history.

(56) References Cited

U.S. PATENT DOCUMENTS

| | | | | |
|---|---|---|---|---|
| 6,581,026 | B2 * | 6/2003 | Lohse ................. | G06F 30/3323 |
| | | | | 703/2 |
| 7,035,886 | B1 * | 4/2006 | Nemecek ....... | G01R 31/318357 |
| | | | | 708/200 |
| 9,305,077 | B2 * | 4/2016 | Branson ................ | G06F 16/285 |
| 10,672,204 | B2 * | 6/2020 | Chopra ............... | G07C 5/0825 |
| 10,964,130 | B1 * | 3/2021 | Dixit .................. | G05B 23/0283 |

(Continued)

FOREIGN PATENT DOCUMENTS

| | | | | |
|---|---|---|---|---|
| EP | 3486739 | A1 | 5/2019 | |
| EP | 4379576 | A1 * | 6/2024 | .......... G07C 5/0808 |

(Continued)

OTHER PUBLICATIONS

Unsupervised Learning of Data Representations and Cluster Structures: Applications to Large-scale Health Monitoring of Turbofan Aircraft Engines (Year: 2021).*

(Continued)

*Primary Examiner* — Ronnie M Mancho

(74) *Attorney, Agent, or Firm* — Greer, Burns & Crain, Ltd.

(57) ABSTRACT

A method for determining a probability of occurrence of a malfunction creating a performance defect in an aircraft makes it possible to process a set of input data so as to retain only measurements relevant with regard to determining the probability of occurrence of the malfunction following a previous event. In other words, the method makes it possible to refine a set of input data so as to establish relevant causal links between records of measurements and a malfunction, so as to determine a probability of occurrence of a malfunction based on the occurrence of one or more previous events.

7 Claims, 2 Drawing Sheets

(56)         References Cited

U.S. PATENT DOCUMENTS

| | | | | |
|---|---|---|---|---|
| 12,079,329 | B2 * | 9/2024 | Kottapalli | ............... G06F 21/55 |
| 2015/0088887 | A1 * | 3/2015 | Branson | ................... G06F 16/26 |
| | | | | 707/737 |
| 2015/0287249 | A1 | 10/2015 | Lacaille et al. | |
| 2019/0147670 | A1 * | 5/2019 | Chopra | ................ G07C 5/0808 |
| | | | | 701/29.1 |
| 2023/0237150 | A1 * | 7/2023 | Kottapalli | ............... G06F 21/55 |
| | | | | 726/23 |
| 2024/0174379 | A1 * | 5/2024 | Dautelle | ................... B64F 5/40 |

FOREIGN PATENT DOCUMENTS

| | | | | |
|---|---|---|---|---|
| WO | WO-2013103569 A1 | * | 7/2013 | ........... G06V 10/764 |
| WO | 2014064396 A2 | | 5/2014 | |

OTHER PUBLICATIONS

French Search Report for corresponding French Patent Application No. 2212516 dated Jun. 22, 2023; priority document.

* cited by examiner

METHOD FOR DETERMINING A PROBABILITY OF OCCURRENCE OF A MALFUNCTION CREATING A PERFORMANCE DEFECT IN AN AIRCRAFT

CROSS-REFERENCES TO RELATED APPLICATIONS

This application claims the benefit of the French patent application No. 2212516 filed on Nov. 29, 2022, the entire disclosures of which are incorporated herein by way of reference.

FIELD OF THE INVENTION

The invention relates to the field of the preventative maintenance of aircraft, and relates more particularly to the prediction of the occurrence of a malfunction creating a performance defect in an aircraft.

BACKGROUND OF THE INVENTION

As is known, learning systems, called artificial intelligence systems, are trained with databases. The databases used to train learning systems are carefully constructed. Indeed, it is necessary for the database to contain enough cases on the subject on which the learning system is trained. The greater the number of cases to be studied, the more the learning system is able to establish relevant correlations between the elements present in the database.

However, the use of a learning system is limited for rare phenomena. Indeed, if the learning database contains too few cases to be studied, then the learning system is not able to establish reliable correlations. This is the case, for example, for malfunctions reducing the performance of an aircraft. The very low number of these malfunctions may, at present, be a barrier to constructing a database that is rich enough to allow a learning system to analyze malfunctions in order to establish precise probabilities of occurrence of a malfunction on the basis of past events. Indeed, faced with an excessively small amount of data, the learning system may be limited in terms of its ability to determine which previous events have an impact on the occurrence of a malfunction.

To overcome a small number of cases in a database of a learning system, two techniques are mainly used.

A first technique consists in reducing the size of the database so as to have 50% actual incidents in the whole database. The problem with this technique is that, when the number of cases is really low, this means drastically reducing the size of the database to a size that no longer allows a learning system to be trained.

A second technique consists in artificially cloning the cases to be studied in order to increase the number thereof. The problem with this technique is that it distorts the statistics in terms of the occurrence of a case to be studied.

In this context, it is therefore necessary to provide a method for determining a probability of occurrence of a malfunction creating a performance defect in an aircraft, which method makes it possible to use a small number of learning data to provide a reliable statistical determination.

SUMMARY OF THE INVENTION

To this end, according to a first aspect, what is proposed is a method for determining a probability of occurrence of a malfunction creating a performance defect in an aircraft. The method is executed by a computing system comprising electronic circuitry that implements the following steps:

acquiring a set of input data each relating to the occurrence of the malfunction in an aircraft, each input datum comprising a timestamped notification of the malfunction and a timestamped record of measurements from sensors of the aircraft;

grouping the input data into groups of malfunctions having the same root cause;

delimiting a causal time window for the malfunction, an upper bound of the causal time window being the timestamped notification of the malfunction, and, for each input datum, retaining only a sample containing the measurements contained within the causal time window;

weighting each measurement of the same sample, the sum of the weights of the same sample being equal to 1;

filtering the measurements of each sample so as to retain only measurements of interest with respect to the malfunction;

comparing the measurements of interest of each sample with reference measurements, and for each measurement of interest of a sample that is greater than the corresponding reference measurement, assigning a first Boolean value to the measurement of interest, and for each measurement of interest of a sample that is less than the corresponding reference measurement, assigning a second Boolean value to the measurement of interest different from the first Boolean value, so as to obtain a series of Boolean values;

splitting each group into a plurality of subgroups, each subgroup corresponding to a variation of one or more Boolean values of the series of Boolean values, such that, for each group, there are 2n subgroups, where n is the number of Boolean values, and dividing each sample of the same group into a subgroup corresponding to the Boolean values of each sample;

calculating the sum of the weights of the measurements of each subgroup;

using the sum of the weights of each subgroup to determine a probability of occurrence of the malfunction for each subgroup;

carrying out a maintenance action on an aircraft according to the determined probability of occurrence of the malfunction.

The proposed method thus makes it possible to process a set of input data so as to retain only measurements relevant with regard to determining a probability of occurrence of a malfunction. In other words, the method according to the invention makes it possible to refine a set of input data so as to establish relevant causal links between previous events (measurements) and a malfunction, so as to determine a probability of occurrence of an incident based on the occurrence of one or more previous events, and allow a maintenance action to be carried out accordingly.

According to one particular provision, the weight of each measurement is calculated according to W=1/N, where: W is the weight and N is the number of measurements in the sample.

According to one particular provision, the weight of each measurement is corrected according to $$Wc = \frac{CW(-t) \times W}{NF},$$

where Wc is the corrected weight, CW is the causal time window and NF is a normalization factor.

According to the same provision, the normalization factor NF is calculated according to: $NF=\Sigma CW(-t)\times W$.

According to one particular provision, a learning system uses the sum of the weights of each subgroup to determine a probability of occurrence of the malfunction for each subgroup.

According to another aspect, what is proposed is a computer program product comprising program code instructions for executing the proposed method when the instructions are executed by a processor.

According to another aspect, what is proposed is a non-transient storage medium on which there is stored a computer program comprising program code instructions for executing the proposed method when the instructions are read from the non-transient storage medium and executed by a processor.

According to another aspect, what is proposed is a computing system comprising electronic circuitry configured to determine a probability of occurrence of a malfunction creating a performance defect in an aircraft, the electronic circuitry implementing at least the following steps:

acquiring a set of input data each relating to the occurrence of the malfunction in an aircraft, each input datum comprising a timestamped notification of the malfunction and a timestamped record of measurements from sensors of the aircraft;

grouping the input data into groups of malfunctions having the same root cause;

delimiting a causal time window for the malfunction, an upper bound of the causal time window being the timestamped notification of the malfunction, and, for each input datum, retaining only a sample containing the measurements contained within the causal time window;

weighting each measurement of the same sample, the sum of the weights of the same sample being equal to 1;

filtering the measurements of each sample so as to retain only measurements of interest with respect to the malfunction;

comparing the measurements of interest of each sample with reference measurements, and for each measurement of interest of a sample that is greater than the corresponding reference measurement, assigning a first Boolean value to the measurement of interest, and for each measurement of interest of a sample that is less than the corresponding reference measurement, assigning a second Boolean value to the measurement of interest different from the first Boolean value, so as to obtain a series of Boolean values;

splitting each group into a plurality of subgroups, each subgroup corresponding to a variation of one or more Boolean values of the series of Boolean values, such that, for each group, there are 2n subgroups, where n is the number of Boolean values, and dividing each sample of the same group into a subgroup corresponding to the Boolean values of each sample;

calculating the sum of the weights of the measurements of each subgroup;

using the sum of the weights of each subgroup to determine a probability of occurrence of the malfunction for each subgroup.

BRIEF DESCRIPTION OF THE DRAWINGS

The abovementioned features of the invention, as well as others, will become more clearly apparent from reading the following description of at least one exemplary embodiment, the description being given in relation to the appended drawings, in which.

DETAILED DESCRIPTION OF THE PREFERRED EMBODIMENTS

Method for determining a probability of occurrence of a malfunction creating a performance defect in an aircraft.

Figure 1:
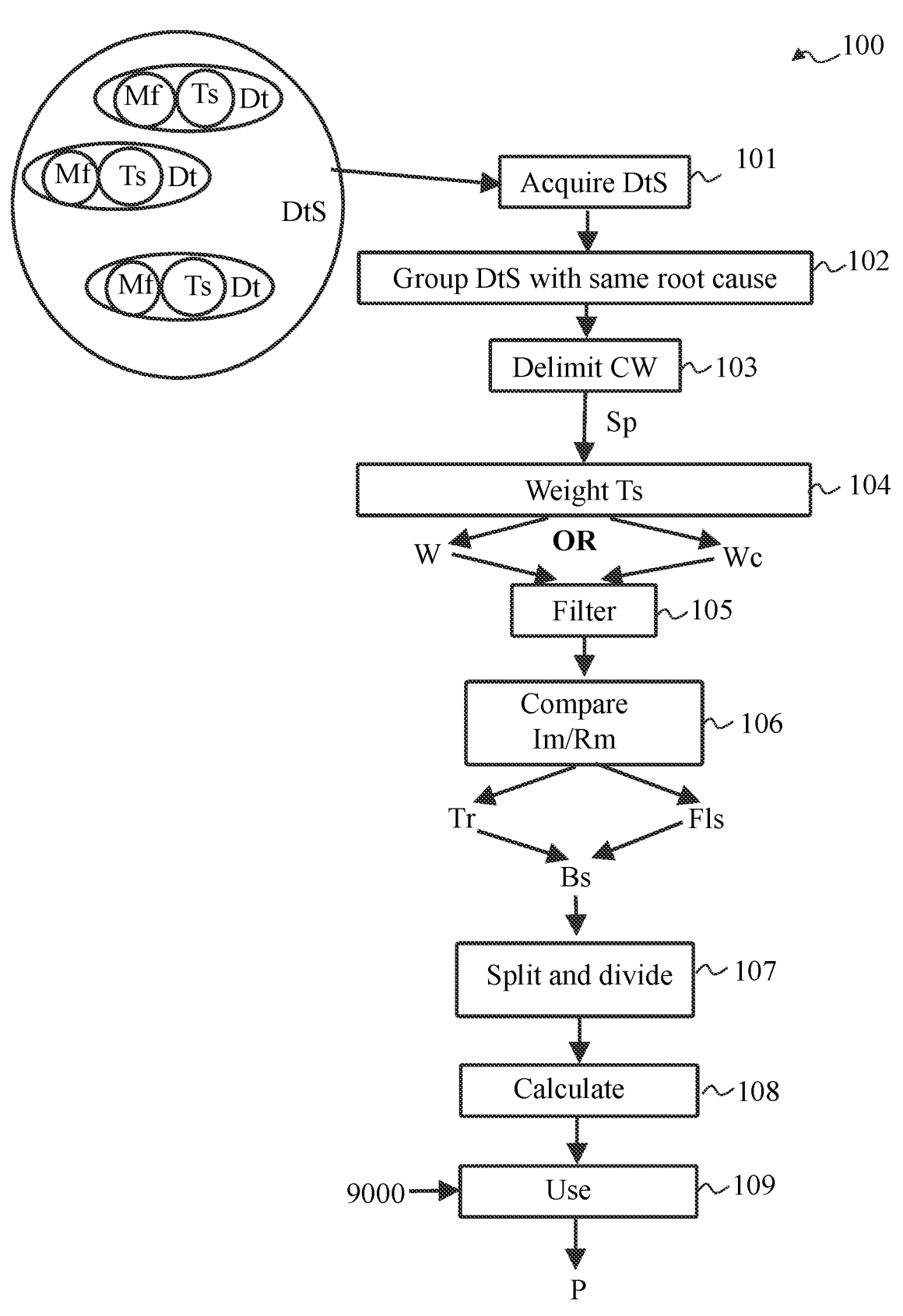
FIG. 1 schematically illustrates the processing of a method for determining a probability of occurrence of a malfunction creating a performance defect in an aircraft.

With reference to FIG. 1, according to a first aspect, what is proposed is a method 100 for determining a probability P of occurrence of a malfunction Mf creating a performance defect in an aircraft. As will be described below, the method 100 is implemented by a computing system 200 comprising electronic circuitry. The computing system 200 is designed to implement the steps of the method 100.

The method 100 comprises a plurality of steps that will be detailed below.

A first step 101 of the method consists in acquiring a set DtS of input data Dt each relating to the occurrence of the malfunction Mf in an aircraft, each input datum Dt comprising a timestamped notification of the malfunction Mf and a timestamped record of measurements Ts from sensors of the aircraft. The timestamped record of measurements Ts may be a record from aircraft flight recorders (black boxes). The timestamped record of measurements Ts may therefore comprise a large number of measurements able to be traced back to the commissioning of the aircraft. A large number of measurements is understood to mean that the timestamped record of measurements may contain measurements from a wide variety of sensors of the aircraft. According to one embodiment, the timestamped record of measurements contains measurements from the entire set of sensors of the aircraft.

Next, the method comprises a step 102 consisting in grouping the input data Dt into groups of malfunctions Mf having the same root cause.

According to one particularly advantageous provision, this step 102 comprises identifying patterns of previous events and measurements leading to a malfunction Mf.

For example, if the malfunction Mf being studied is corrosion of a part, a previous event leading to this malfunction may be parking of the aircraft at an airport near the sea. It is specified that a datum relating to the parking of the aircraft may be obtained from measurements from a (GPS, Global Positioning System) localization system of the aircraft. Indeed, a localization system may transmit timestamped measurements of a position. If an aircraft remains in the same position for several hours or days, which is also identified as an airport, then it is parked at this airport.

Grouping by root causes makes it possible to separate malfunctions Mf having different causes.

A following step 103 of the method consists in delimiting a causal time window CW for the malfunction Mf, an upper bound of the causal time window CW being the timestamped notification of the malfunction Mf, and, for each input datum Dt, in retaining only a sample Sp containing the measurements Ts contained within the causal time window CW. More specifically, depending on the malfunction Mf being studied, the causal time window CW may be longer or shorter. Indeed, it is determined that, for some malfunctions Mf, only the measurements Ts taken a few minutes or a few hours before the occurrence of the malfunction Mf have an impact. On the other hand, other malfunctions Mf take place over a longer duration and the causal time window CW must be several months or several years. Particularly advantageously, determining the causal time window CW makes it possible to refine the input data Dt so as to retain only a sample Sp containing the measurements Ts contained within the causal time window CW. In other words, this provision makes it possible to reduce the volume of input data Dt by erasing data for which it is certain that they are not relevant to determining the probability P of occurrence of the malfunction Mf.

According to one embodiment, the causal time window CW is said to be rectangular. It is then a causal time window CW covering the whole of a time period between two bounds delimiting the causal time window CW.

According to another embodiment, the causal time window CW may have another structure. For example, according to one embodiment, it may be estimated that the position in time of the measurements Ts varies their importance with regard to the probability P of occurrence of the malfunction. According to this embodiment, the measurements Ts may be weighted, during step 103, on the basis of their position in the causal time window CW.

Next, the method comprises a step 104 consisting in weighting each measurement Ts of the same sample Sp. The weighting is carried out such that the sum of the weights of the same sample Sp is equal to 1.

In other words, the previous steps have made it possible to sort and group the measurements Ts so as to have samples Sp in which the malfunctions Mf have the same root causes and in which the measurements Ts potentially each have an impact on the occurrence of the malfunction Mf. Each sample contains measurements Ts relating to malfunctions Mf. It is therefore established that, in each sample, the probability of having a malfunction is 1.

According to one embodiment, the weight of each measurement Ts is calculated according to W=1/N, where: W is the weight and N is the number of measurements Ts in the sample Sp.

In other words, the weight of each measurement of the sample corresponds to 1 (the probability of presence of a malfunction in the sample) divided by the total number of measurements in the sample. This weighting mode is particularly suitable when the causal time window CW determined beforehand is said to be rectangular.

According to another embodiment, the weight of each measurement Ts is corrected according to $$Wc = \frac{CW(-t) \times W}{NF},$$

where Wc is the corrected weight, CW is the causal time window and NF is a normalization factor.

Preferably, according to this provision, the normalization factor NF is calculated according to: NF=ΣCW(−t)×W.

Once the measurements Ts of each sample Sp have been weighted, the method 100 comprises a step 105 consisting in filtering the measurements of each sample Sp so as to retain only measurements of interest Im with respect to the malfunction Mf.

For example, for a given malfunction Mf, it may be established that the measurements of interest Im are: speed, pressure and outside temperature. For another malfunction Mf, the measurements of interest Im may be determined as being a parking location, a parking duration and air humidity. The measurements of interest Im are thus established on the basis of the malfunction Mf being studied. It is specified that, in a prospective approach, the measurements of interest Im may be modified so as to look for the measurements of interest Im best suited to each malfunction being studied.

Next, the method 100 comprises a step 106 of comparing the measurements of interest Im of each sample Sp with reference measurements Rm, and for each measurement of interest Im of a sample that is greater than the corresponding reference measurement Rm, assigning a first Boolean value Tr to the measurement of interest Im, and for each measurement of interest Im of a sample that is less than the corresponding reference measurement Rm, assigning a second Boolean value Fls to the measurement of interest different from the first Boolean value Tr, so as to obtain a series of Boolean values Bs.

In other words, in step 106, reference measurements Rm are established. These reference measurements Rm correspond to what is called a reference value for a corresponding measurement of interest Im. The reference measurement Rm may be established using charts or may be calculated using, in particular, the measurements of interest Im. A reference measurement Rm may thus, for example, be determined as an average of all of the corresponding measurements of interest Im. Each measurement of interest Im is compared with the corresponding reference measurement Rm. If the measurement of interest Im is greater than the corresponding reference measurement Rm, then a first Boolean value Tr is assigned thereto. If the measurement of interest Im is less than the corresponding reference measurement Rm, then a second Boolean value Fls is assigned thereto. The first Boolean value Tr and the second Boolean value Fls are different. Typically, the first Boolean value Tr may for example be 1 and the second Boolean value Fls may, for example, be 0.

The method 100 then comprises a step 107 of splitting each group into a plurality of subgroups. Each subgroup corresponds to a variation of one or more Boolean values of the series of Boolean values Bs, such that, for each group, there are 2n subgroups, where n is the number of Boolean values. In other words, in the previous step 106, a Boolean value was assigned to each measurement of interest Im. Each sample Sp thus comprises a series of Boolean values Bs. The division into subgroups makes it possible to combine samples having the same Boolean series Bs. This step 107 therefore makes it possible to sort and group the samples Sp on the basis of their series of Boolean values Bs.

Once the samples have been divided into subgroups, the method comprises a step 108 consisting in calculating the weight of each subgroup. It is specified that the weight of each subgroup is calculated by adding the weight, determined in step 104, of each measurement of interest Im of each sample Sp. Indeed, it will be recalled that, in step 104, all of the measurements Ts of each sample Sp were weighted. Next, in step 105, only the measurements of interest Im were retained. The measurements of interest Im are chosen from the measurements Ts and are therefore weighted.

After having calculated the weight of each subgroup, in a step 109, the method 100 uses the sum of the weights of each subgroup to determine a probability P of occurrence of the malfunction Mf.

Particularly advantageously, the method 100 comprises carrying out a maintenance action on an aircraft according to the determined probability P of occurrence of the malfunction.

According to one particularly advantageous provision, a learning system 9000 is used to calculate a probability P of occurrence of a malfunction Mf creating a performance defect in an aircraft. Indeed, all of the previous steps make it possible to obtain relevant data to form a learning base for the learning system 9000. In other words, the work on the input data Dt so as—from a large number of data—to select and retain only the measurements of interest Im, and then transform these data into weighted Boolean values, makes it possible to form a powerful learning base for the learning system 9000.

According to one particular provision, the learning system 9000 may form part of the computing system 200.

According to another particular provision, the learning system 9000 is independent of the computing system 200.

According to one particular provision, after the learning system 9000 has been trained, it may be integrated into an aircraft in order to produce reports of the probability of occurrence of a malfunction, on the basis of the occurrence of an event, of the acquisition of a measurement (a measurement being linked de facto to an event). Advantageously, integration into an aircraft may allow real-time monitoring on the basis of the occurrence of events, thereby possibly allowing the most appropriate preventative maintenance for the aircraft.

According to another provision, after the learning system 9000 has been trained, it may be used by an operator of a fleet of aircraft. The learning system may be fed with records of measurements Ts from all of the aircraft of a fleet of the operator, in order to anticipate maintenance operations on one or more aircraft of the fleet.

Computing System

According to another aspect, what is proposed is a computing system 200 comprising electronic circuitry configured to determine a probability of occurrence of a malfunction creating a performance defect in an aircraft, as described above.

Figure 2:
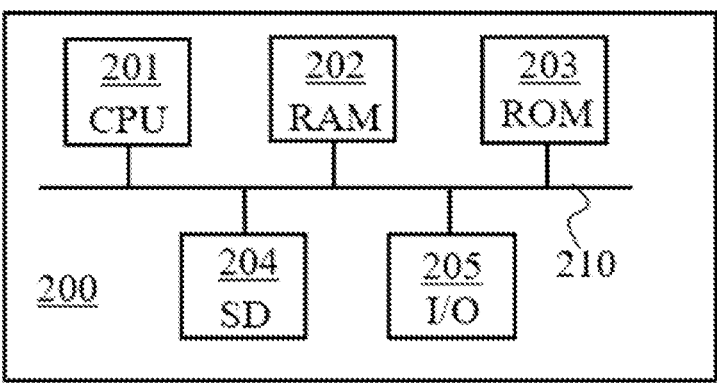
FIG. 2 schematically illustrates a hardware layout of a computing system that comprises electronic circuitry for implementing a method for determining a probability of occurrence of a malfunction creating a performance defect in an aircraft.

As shown schematically in FIG. 2, the computing system 200 may comprise the following, connected by a communication bus 210: a processor 201; a random access memory 202; a read-only memory 203, for example a ROM (read-only memory) or EEPROM (electrically erasable programmable read-only memory) and an input-output interface manager 205.

The processor 201 is capable of executing instructions loaded into the random access memory 202 from the read-only memory 203, from an external memory, from a storage medium (such as an SD card), or from a communication network. When the computing system 200 is powered up, the processor 201 is capable of reading instructions from the random access memory 202 and of executing them. These instructions form a computer program allowing the processor 201 to implement the methods and steps described here.

All or some of the methods and steps described above may thus be implemented in software form through the execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit) component. Generally speaking, the computing system 200 comprises electronic circuitry designed and configured to implement, in software form and/or hardware form, the methods and steps described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a probability of occurrence of a malfunction creating a performance defect in an aircraft, the method being executed by a computing system comprising electronic circuitry that implements the following steps:

acquiring a set of input data each relating to the occurrence of the malfunction in the aircraft, each input datum comprising a timestamped notification of the malfunction and a timestamped record of measurements from sensors of the aircraft;

grouping the input data into groups of malfunctions having the same root cause;

delimiting a causal time window for the malfunction, an upper bound of the causal time window being the timestamped notification of the malfunction, and, for each input datum, retaining only a sample containing measurements contained within the causal time window;

weighting each measurement of the same sample, a sum of weights of the same sample being equal to 1;

filtering the measurements of each sample so as to retain only measurements of interest with respect to the malfunction;

comparing the measurements of interest of each sample with reference measurements, and for each measurement of interest of a sample that is greater than the corresponding reference measurement, assigning a first Boolean value to the measurement of interest, and for each measurement of interest of a sample that is less than the corresponding reference measurement, assigning a second Boolean value to the measurement of interest different from the first Boolean value, so as to obtain a series of Boolean values;

splitting each group into a plurality of subgroups, each subgroup corresponding to a variation of one or more Boolean values of the series of Boolean values, such that, for each group, there are 2n subgroups, where n is a number of Boolean values, and dividing each sample of the same group into a subgroup corresponding to the Boolean values of each sample;

calculating a sum of the weights of the measurements of each subgroup;

using the sum of the weights of each subgroup to determine a probability of occurrence of the malfunction for each subgroup; and carrying out a maintenance action on an aircraft according to the determined probability of occurrence of the malfunction.

2. The method according to claim 1, wherein the weight of each measurement is calculated according to W=1/N, where: W is the weight and N is a number of measurements in the sample.

3. The method according to claim 1, wherein the weight of each measurement is corrected according to $$Wc = \frac{CW(-t) \times W}{NF},$$

where Wc is the corrected weight, CW is a causal time window and NF is a normalization factor.

4. The method according to claim 3, wherein the normalization factor NF is calculated according to: NF=Σ CW(−t)×W.

5. The method according to claim 1, wherein a learning system uses the sum of the weights of each subgroup to determine a probability of occurrence of the malfunction for each subgroup.

6. A non-transient storage medium on which there is stored a computer program comprising program code instructions for executing the method according to claim 1 when said instructions are read from said non-transient storage medium and executed by a processor.

7. A computing system comprising electronic circuitry configured to determine a probability of occurrence of a malfunction creating a performance defect in an aircraft, the electronic circuitry implementing at least the following steps:

acquiring a set of input data each relating to the occurrence of said malfunction in the aircraft, each input datum comprising a timestamped notification of the malfunction and a timestamped record of measurements from sensors of the aircraft;

grouping the input data into groups of malfunctions having the same root cause;

delimiting a causal time window for the malfunction, an upper bound of the causal time window being the timestamped notification of the malfunction, and, for each input datum, retaining only a sample containing measurements contained within the causal time window;

weighting each measurement of the same sample, a sum of weights of same sample being equal to 1;

filtering the measurements of each sample so as to retain only measurements of interest with respect to the malfunction;

comparing the measurements of interest of each sample with reference measurements, and for each measurement of interest of a sample that is greater than the corresponding reference measurement, assigning a first Boolean value to said measurement of interest, and for each measurement of interest of a sample that is less than the corresponding reference measurement, assigning a second Boolean value to said measurement of interest different from the first Boolean value, so as to obtain a series of Boolean values;

splitting each group into a plurality of subgroups, each subgroup corresponding to a variation of one or more Boolean values of the series of Boolean values, such that, for each group, there are 2n subgroups, where n is a number of Boolean values, and dividing each sample of the same group into a subgroup corresponding to the Boolean values of each sample;

calculating the sum of the weights of the measurements of each subgroup; and using the sum of the weights of each subgroup to determine a probability of occurrence of the malfunction for each subgroup.

* * * * *